United States Patent
Ueda

(10) Patent No.: US 9,116,874 B2
(45) Date of Patent: Aug. 25, 2015

(54) VIRTUAL MACHINE TEST SYSTEM, VIRTUAL MACHINE TEST METHOD

(71) Applicant: Hitachi, Ltd., Tokyo (JP)

(72) Inventor: Ryoichi Ueda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/373,850

(22) PCT Filed: Sep. 25, 2013

(86) PCT No.: PCT/JP2013/075883
§ 371 (c)(1),
(2) Date: Jul. 22, 2014

(87) PCT Pub. No.: WO2015/045031
PCT Pub. Date: Apr. 2, 2015

(65) Prior Publication Data
US 2015/0089292 A1    Mar. 26, 2015

(51) Int. Cl.
*G06F 11/00* (2006.01)
*G06F 11/263* (2006.01)
*G06F 9/455* (2006.01)

(52) U.S. Cl.
CPC .......... *G06F 11/263* (2013.01); *G06F 9/45533* (2013.01)

(58) Field of Classification Search
USPC .................................................. 714/25, 2, 1
See application file for complete search history.

(56) References Cited

U.S. PATENT DOCUMENTS

| 8,949,428 B2 * | 2/2015 | Dow et al. ..................... 709/226 |
| 8,997,048 B1 * | 3/2015 | Pomerantz et al. ........... 717/124 |
| 2013/0055250 A1 * | 2/2013 | Pechanec et al. ................. 718/1 |

FOREIGN PATENT DOCUMENTS

JP    2010-113381 A    5/2010

OTHER PUBLICATIONS

Atsushi Nakata, "SI and operation will disappear Cloud and return to hardware, accelerated two verticle integrations," Nikkei Computer, No. 810, Jun. 7, 2012, p. 36.
Haruhiko Kajikawa, "Skillup with open environments! Why don't you use Clouds more?" OpenStack, CloudStack, Cloud Foundry, Scalr, Eucalyptus, SoftwareDesign No. 269, Mar. 18, 2013, pp. 56-59.
International Search Report and Written Opinion of the International Searching Authority for International Application No. PCT/JP2013/075883 dated Jan. 14, 2014.
McChesney, Bobby, et al., Manage application services with virtual application patterns—Virtual application patters capture years of cloud application services management expertise; , Retrieved on Aug. 23, 2013 from the Internet: <URL: http://www.ibm.com/developerworks/cloud/library/cl-puresystem-vap/>; pp. 1-15; IBM Corporation 2012.

* cited by examiner

*Primary Examiner* — Sarai Butler
(74) *Attorney, Agent, or Firm* — Foley & Lardner LLP

(57) ABSTRACT

An objective of the present invention is to efficiently perform a platform level test on a computer system comprising virtual machines that are automatically built according to predefined templates. A virtual machine test system according to the present invention creates a virtual machine according to a system template defining a combination of a network topology type of virtual machines and a role of each of the virtual machines, and performs a platform level test according to a test item defined for each of the combination (refer to FIG. 1).

10 Claims, 13 Drawing Sheets

| ID | Sys Type | Role | Test Item | Arguments |
|---|---|---|---|---|
| 1 | Web3 | Web | LB | Web:VMIDs, Web:Min, Web:Max |
| 2 | Web3 | Web | HA | Web:VMIDs |
| 3 | Web3 | DB | HA | DB:VMIDs |
| 4 | Web3 | DB | Replica | DB:VMIDs |
| 5 | Web3 | DB | Backup | DB:VMIDs |
| 6 | All | All | Connect | All:ConnIDs |
| 7 | All | All | Perf | — |
| 8 | ... | ... | ... | |

VIRTUAL MACHINE TEST SYSTEM, VIRTUAL MACHINE TEST METHOD

TECHNICAL FIELD

The present invention relates to a technique for performing a platform-level test on a computer system configured by using a virtual machine.

BACKGROUND ART

In cloud environments, it is common that computational resources such as virtualized servers, virtualized storages, or virtualized networks are collectively procured and pooled, and then resources are drawn from this resource pool to utilize the drawn resources in building systems.

Non Patent Literatures 1 listed below describes a technique in which a computer system comprising multiple virtual machines (Hereinafter, VM) is built on a cloud environment according to a "virtual application pattern" used as a system template. In the technique described in that document, configuration patterns of virtual machine systems for configuring computer systems are defined in advance. Virtual machines are automatically created by selecting such templates according to the definition.

CITATION LIST

Non Patent Literature

Non Patent Literature 1: Manage application services with virtual application patterns, URL: http://www.ibm.com/developerworks/cloud/library/cl-puresystem-vap/ (acquired on Aug. 23, 2013)

SUMMARY OF INVENTION

Technical Problem

According to the technique described in Non Patent Literature 1, it is possible to rapidly build a computer system comprising virtual machines on the basis of predefined system templates. On the other hand, it is necessary to individually perform tests on the built computer system. Thus it is conceivable that there could be a problem in terms of work efficiency or lack of test items. Hereinafter, examples of such problems will be described.

The computer system built by the technique described in the Non Patent Literature 1 is automatically created according to predefined system templates. Thus it could be assumed that tests on such system templates might be sufficient. However, since the technique in the Non Patent Literature 1 provides a cloud environment in which server machines are installed in users' environments, specific system environments are different for each of users. Therefore, even if the system templates are already tested, it may be necessary to perform tests on the built computer system in the actual user environments.

For example, in actual user environments, a case could be assumed where resources (such as network bandwidth) are shared between computer systems and thus it is necessary to perform tests on influences from other computer systems. Such tests for physical environments are required to be performed in the user environments where the computer system is actually built. Such types of tests are referred to as platform level tests (or system tests) and are performed separately from application level tests. Non Patent Literature 1 may have a problem in that such platform level tests are required to be performed manually.

The present invention is made in terms of the problem above. An objective of the present invention is to efficiently perform a platform level test on a computer system comprising virtual machines that are automatically built according to predefined templates.

Solution to Problem

A virtual machine test system according to the present invention creates a virtual machine according to a system template defining a combination of a network topology type of virtual machines and a role of each of the virtual machines, and performs a platform level test according to a test item defined for each of the combination.

Advantageous Effects of Invention

With a virtual machine test system according to the present invention, it is possible to automatically perform a platform level test on a computer system comprising virtual machines that are automatically built according to a system template.

BRIEF DESCRIPTION OF DRAWINGS

FIG. 9 is a diagram showing a configuration example of test item data 1616.

DESCRIPTION OF EMBODIMENTS

Figure 1:
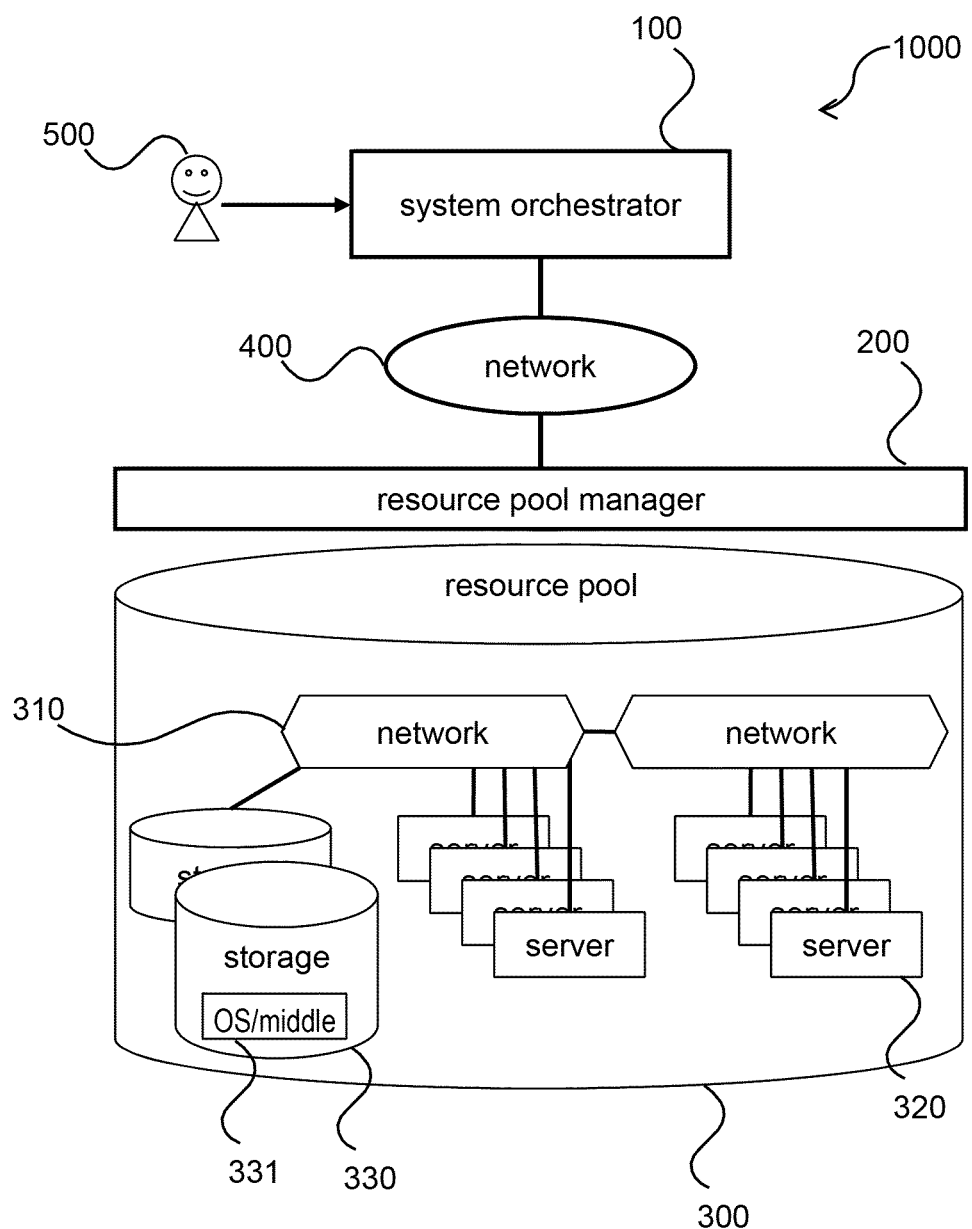
FIG. 1 is a configuration diagram of a virtual machine test system 1000 according to an embodiment 1.

<Embodiment 1: System Configuration>
FIG. 1 is a configuration diagram of a virtual machine test system 1000 according to an embodiment 1 of the present invention. The virtual machine test system 1000 is a system that is configured by using virtual machines. The virtual machine test system 1000 includes a system orchestrator 100, a resource pool manager 200, and a resource pool 300.

The resource pool 300 is a collection of computational resources such as a network device 310, a server 320, or a storage 330. The storage 330 stores OS (Operating System)/middleware 331. The resource pool manager 200 draws computational resources in the resource pool 300 to provide them for building virtual machines. The system orchestrator 100 builds a system using virtual machines according to instructions from a system builder 500, and performs tests on the built system. The network 400 connects the system orchestrator 100, the resource pool manager 200, and the resource pool 300 with each other.

<Embodiment 1: Configuration of System Orchestrator>

Figure 2:
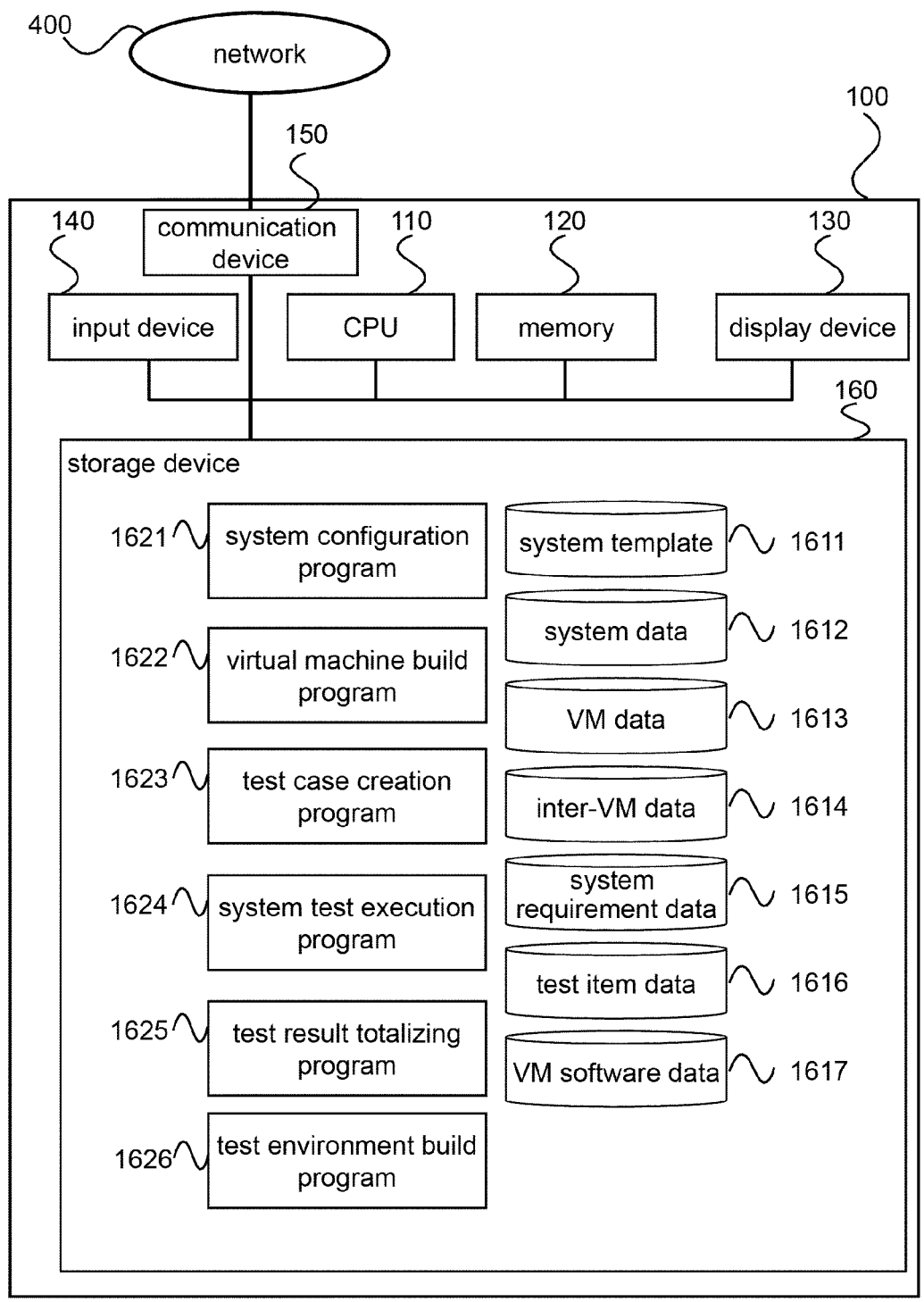
FIG. 2 is a configuration diagram of a system orchestrator 100.

FIG. 2 is a configuration diagram of the system orchestrator 100. The system orchestrator 100 is a computer that builds computer systems using virtual machines and that performs system tests. The system test mentioned here is a platform level test for computer systems comprising virtual machines. Specific examples of test items will be described later. The system orchestrator 100 includes a CPU 110, a memory 120, a display device 130, an input device 140, a communication device 150, and a storage device 160.

The CPU 110 executes programs stored in the storage device 160. Hereinafter, for convenience sake of description, each program may be described as an actor. However, the CPU 110 actually executes such programs. The memory 120 stores data used by the CPU 110 temporarily. The display device 130 is a screen display device such as displays. The input device 140 is an operation device such as keyboard or mouse. The communication device 150 is an interface that connects the system orchestrator 100 to the network 400.

The storage device 160 stores a system configuration program 1621, a virtual machine build program 1622, a test case creation program 1623, a system test execution program 1624, a test result totalizing program 1625, a test environment build program 1626, a system template 1611, system data 1612, VM data 1613, inter-VM connection data 1614, system requirement data 1615, test item data 1616, and VM software data 1617. Details of each programs and data will be described later.

Functions implemented by each programs may be achieved by hardware such as circuit devices implementing the same or similar functions. Hereinafter, it is assumed that the functions are implemented as programs. It is not always necessary to implement these programs or hardware on a single device. These programs or hardware may be installed on multiple computers in the virtual machine test system 1000 in a distributed manner. It applies to the resource pool manager 200.

<Embodiment 1: Data Configuration>

Figure 3:
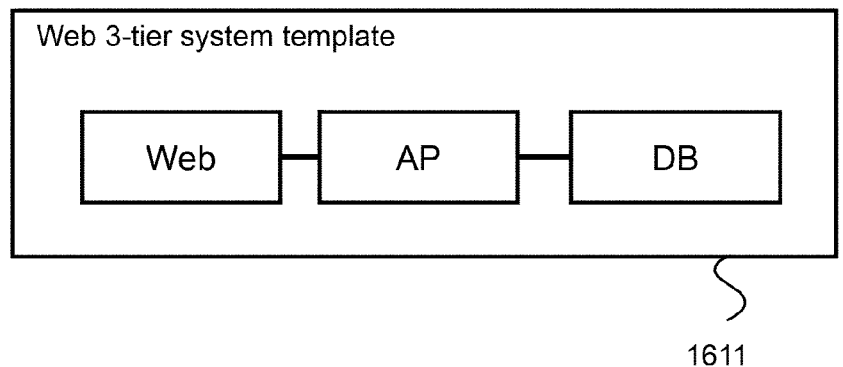
FIG. 3 is a schematic diagram showing a configuration example of a system template 1611.
Figure 3:
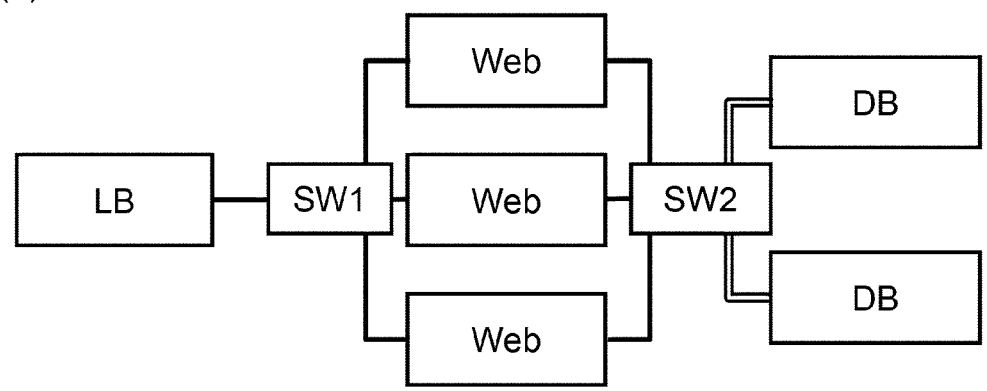

FIG. 3 is a schematic diagram showing a configuration example of the system template 1611. FIG. 3 (*a*) shows a template example of a Web 3-tier system. When building a computer system according to this template, the system orchestrator 100 assigns, to each virtual machine, a role among three roles of Web server, application (AP) server, and database (DB) server. The system orchestrator 100 allocates the Web server in a position where the Web server is connected to the network 400. The system orchestrator 100 creates a network topology such that the AP server and the DB server are sequentially allocated under the Web server.

In addition to the basic network topology shown in FIG. 3, more detailed network topologies may be created by adding various configuration parameters. For example, it is assumed that the system builder 500 provides following configuration parameters to the system orchestrator 100.

(configuration parameter 1) Three Web servers will be created. Load balancing will be performed;
(configuration parameter 2) AP server will be built on the same VM as that of Web server;
(configuration parameter 3) Two DB servers will be created and will be multiplexed.

FIG. 3 (*b*) is a diagram exemplifying a system configuration in which the configuration parameters above are applied to the Web 3-tier system template. Since it is specified that a load balancing is performed for the Web server, a load balancer LB is newly added. Since it is specified that the AP server is created on the same VM as that of the Web server, the AP server is omitted. Since it is specified that multiple of Web servers and DB servers are created, these servers are connected under switches SW1 and SW2, respectively.

The load balancer LB and each of the switches SW may be configured using virtual machines built from the resource pool 300. Alternatively, similar network topologies may be created by providing a load balancer and switch devices in the resource pool 300 in advance and by defining the connection relationship between virtual machines and these devices.

The system template 1611 is created by the system builder 500 in advance and is stored in the storage device 160, for example. In FIG. 3, a network topology of Web 3-tier system is exemplified. However, other types of network topology may be defined as templates so that anyone of those templates can be selected.

The network topology that will be created when configuration parameters above are provided to the system template 1611 may be previously described as configuration data and may be stored in the storage device 160. Alternatively, such configurations may be implemented as functions of the system configuration program 1621 or of the virtual machine build program 1622.

Figure 4:
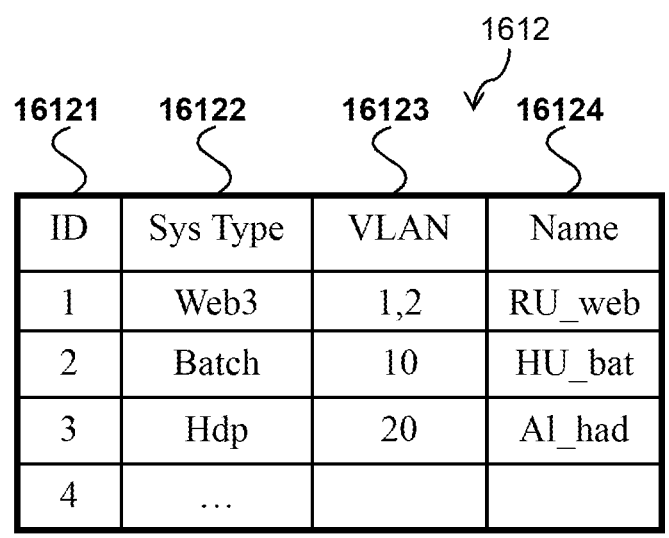
FIG. 4 is a diagram showing a configuration example of system data 1612.

FIG. 4 is a diagram showing a configuration example of the system data 1612. The system data 1612 is a data table managing computer systems created by the system orchestrator 100. The system data 1612 includes a system ID 16121, a system type 16122, a VLAN 16123, and a system name 16124.

The system ID 16121 is an ID for identifying computer systems created by the system orchestrator 100. The system type 16122 indicates a template type of the relevant system. The VLAN 16123 indicates a VLAN ID used by the relevant system in the resource pool 300. The system name 16124 indicates a name of the relevant system. The first record in FIG. 4 indicates that: a computer system "RU_Web" with a system ID "1" is built using a Web 3-tier system template; and the computer system uses VLANs "1" and "2".

Figure 5:
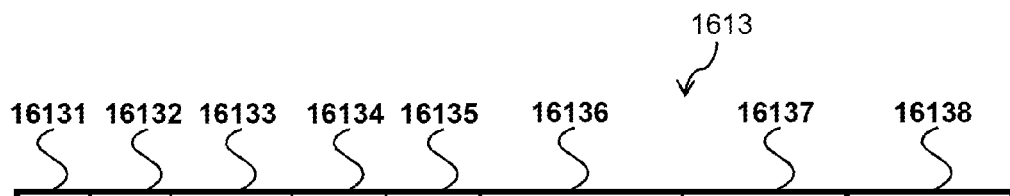
FIG. 5 is a diagram showing a configuration example of VM data 1613.

FIG. 5 is a diagram showing a configuration example of the VM data 1613. The VM data 1613 is data managing virtual machines created by the system orchestrator 100. The VM data 1613 includes a VMID 16131, a system ID 16132, a role 16133, a core number 16134, a memory capacity 16135, a network interface 16136, a storage resource 16137, and a physical server 16138.

The VMID 16131 is an ID identifying virtual machines. The system ID 16132 is a system ID and corresponds to the system ID 16121. The role 16133 indicates a role assigned to the relevant virtual machine. The core number 16134 indicates a number of CPU cores assigned to the relevant virtual machine. The memory capacity 16135 indicates a memory capacity assigned to the relevant virtual machine. The network interface 16136 indicates a network interface number and an IP address included in the relevant virtual machine. The storage resource 16137 indicates an identifier and a capacity of a storage resource assigned to the relevant virtual machine. The physical server 16138 indicates an identifier of a physical server on which the relevant virtual machine works.

The data example shown in FIG. 5 indicates that there are six VMs with VMID "1" to "6" that are belonging to a system ID "1". In addition, the data example shows that: the VM with VMID "1" has a role of load balancer (LB), has one CPU core, has 2 GB memory, has two network interfaces (IP address "10.1.1.1" and IP address "10.2.2.1"), has a storage capacity of 10 GB on a storage device "St1", and is built on a physical server "Sv 0-1".

Figure 6:
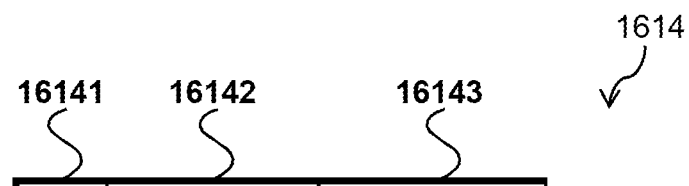
FIG. 6 is a diagram showing a configuration example of inter-VM connection data 1614.

FIG. 6 is a diagram showing a configuration example of the inter-VM connection data 1614. The inter-VM connection data 1614 is data managing connection relationships between virtual machines created by the system orchestrator 100. The inter-VM connection data 1614 includes a connection ID 16141, a network interface number 16142, and a switch ID 16143.

The connection ID 16141 is an ID for identifying connections between each VMs. The network interface number 16142 indicates a pair of the VMID 16131 and an interface number in the network interface 16136. The switch ID 16143 indicates an identifier of a switch to which the relevant network interface is connected.

The first record in FIG. 6 indicates that a network interface with a network interface number "2" included in a VM with VMID "1" is connected to a switch with switch ID "1".

Figure 7:
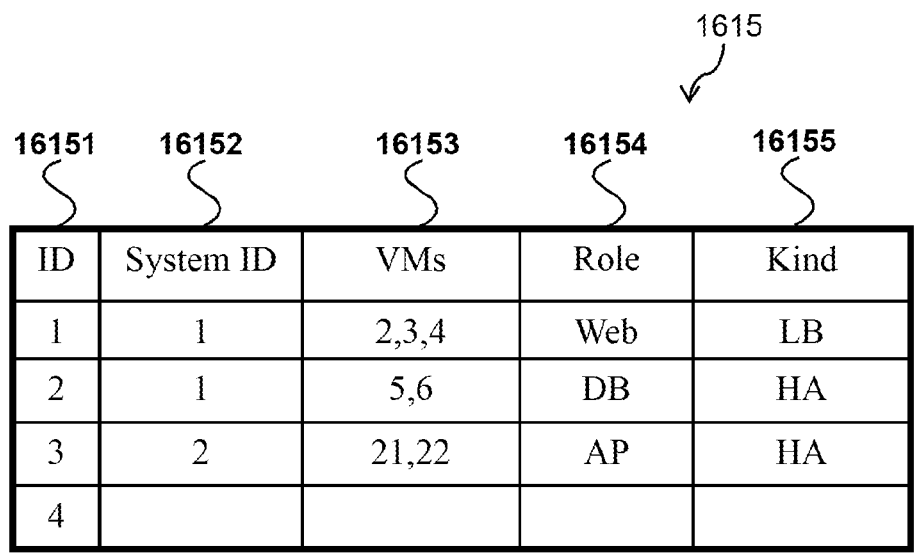
FIG. 7 is a diagram showing a configuration example of system requirement data 1615.

FIG. 7 is a diagram showing a configuration example of the system requirement data 1615. The system requirement data 1615 is data managing system functions implemented by virtual machines included in computer systems built by the system orchestrator 100. The system function mentioned here is a function of platform level implemented by the computer system or the virtual machines. Usually the function refers to common functions implemented before installing individual applications. Specific examples of the system function will be described later. The system requirement data 1615 includes a requirement ID 16151, a system ID 16152, a VMID 16153, a role 16154, and a system function 16155.

The requirement ID 16151 is an ID for identifying each of records. The system ID 16152 corresponds to the system ID 16121. The VMID 16153 is an ID of VM included in the relevant computer system. The role 16154 indicates a role of each VM identified by the VMID 16153. The system function 16155 indicates a system function implemented (or utilized) by each VM identified by the VMID 16153.

The first record in FIG. 7 shows that: in a computer system with system ID "1", three VMs with VMIDs "2", "3", and "4" are Web servers; and those servers include load balance functions (LB) as system functions. This system function may be specified as a configuration parameter added to the system template 1611, as described above. Test items to be performed in the system test are different depending on system functions implemented by the virtual machines. The system function is provided by such as OS, middleware, or network devices (e.g. load balancers or switches). Following functions may be specified as the system function, for example.
(system function example No. 1) load balancing function (LB) for building a load-distributed virtual machine using multiple virtual machines;
(system function example No. 2) multiplexing function (HA) for building a multiplexed virtual machine using multiple virtual machines;
(system function example No. 3) replication function (Replica) for copying virtual machines;
(system function example No. 4) backup function (Backup) for backing up virtual machines.

Figure 8:
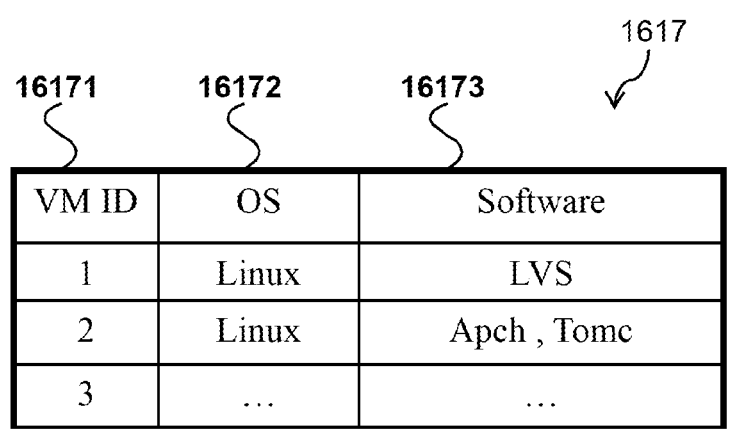
FIG. 8 is a diagram showing a configuration example of VM software data 1617.

FIG. 8 is a diagram showing a configuration example of the VM software data 1617. The VM software data 1617 is data managing software installed on virtual machines. The VM software data 1617 includes a VMID 16171, an OS type 16172, and a software 16173.

The VMID 16171 corresponds to the VMID 16131. The OS type 16172 indicates OS types of the relevant VM. The software 16173 indicates software installed on the relevant VM. The first record in FIG. 8 shows that The VM with VMID "1" uses an OS "Linux (registered trademark)" and that software with a name "LVS" is installed on that VM.

FIG. 9 is a diagram showing a configuration example of the test item data 1616. The test item data 1616 is a table managing system test items that are to be performed by the system orchestrator 100. For example, the system builder 500 creates the test item data 1616 in advance and stores it in the storage device 160. The test item data 1616 includes a test item ID 16161, a system type 16162, a role 16163, a test item 16164, and an argument 16165.

The test item ID 16161 is an ID for identifying each record. The system type 16162 corresponds to the system type 16122. The role 16163 corresponds to the role 16133. The test item 16164 specifies test items that are to be performed for each of roles of VM in each system type. The argument 16165 is an argument that is specified according to each test case. For example, the argument 16165 is configured according to parameters specified in building virtual machines.

According to the data example shown in FIG. 9, test item IDs "1" to "5" are to be performed with respect to computer system of system type "Web3 (Web 3-tier system)". In addition, test items that are to be performed with respect to all system types may be defined. In FIG. 9, test item IDs "6" and "7" correspond to it. The system types 16162 for these records are "All".

System test items that are to be performed with respect to virtual machines included in computer systems are assumed to be different according to roles of virtual machines in the relevant computer system. Thus the test item data 1616 defines the test item 16164 for each of the roles 16163. For example, test items to be performed for Web servers may be different from those for DB servers. Therefore, the test item 16164 assigned for the role "Web" could be different from that for the role "DB".

Further, even if the roles in computer system are the same, test items could be different according to system functions implemented in each virtual machine. Thus the test item data 1616 may define different test items 16164 even if the system type 16162 and the role 16163 are the same. In the data example shown in FIG. 9, test items "LB" and "HA" are assigned to the role "Web". Similarly, three test items are assigned to the role "DB". The procedure by which the system orchestrator 100 selects test items when multiple test items exist for one role will be described in the flowchart mentioned later.

Since the test item 16164 defines test items to be performed according to system functions implemented by virtual machines, the test item 16164 has values each corresponding to system function types. Specifically, according to the examples of system functions described before, values of the test item 16164 may be such as: (1) "LB" which indicates "load balancing test"; (2) "HA" which indicates "multiplexing test"; (3) "Replica" which indicates "replication test"; or (4) "Backup" which indicates "backup test".

Further, test items that are to be performed for all virtual machines may be defined such as: (5) "Connect" which indicates "connectivity test"; or (6) "Perf" which indicates "response performance test". The connectivity test is a test for checking whether network connections used by virtual machines are normally working. The response performance test is a test for testing the duration from issuing a request toward a virtual machine to receiving a response, for example.

When building virtual machines, if the system builder 500 specifies a minimum and a maximum numbers of Web servers, the minimum and maximum numbers may be specified as the argument 16165. "Web:Min" and "Web:Max" in FIG. 9 correspond to it. In addition, since virtual machine IDs are different for each of computer systems, the IDs may be specified as the argument 16165. "VMIDs" in FIG. 9 corresponds to it. The system orchestrator 100 may create test cases using these parameters.

If minimum and maximum numbers of virtual machines are specified, the VMID 16153 in the system requirement data 1615 may describe about it. For example, the VMID 16153 may describe information indicating that VMIDs "2" to "4" must be built and that VMIDs "10" to "15" are optionally built.

The system orchestrator 100 actually performs a lot of test items and specific test items can be readily understood by those skilled in the art. Thus each of test items itself is not described in this document. Each of test items may be described in the test item 16164 or may be described in another data corresponding to each record of the test item data 1616 and be stored in the storage device 160.

<Embodiment 1: System Operation>

Figure 10:
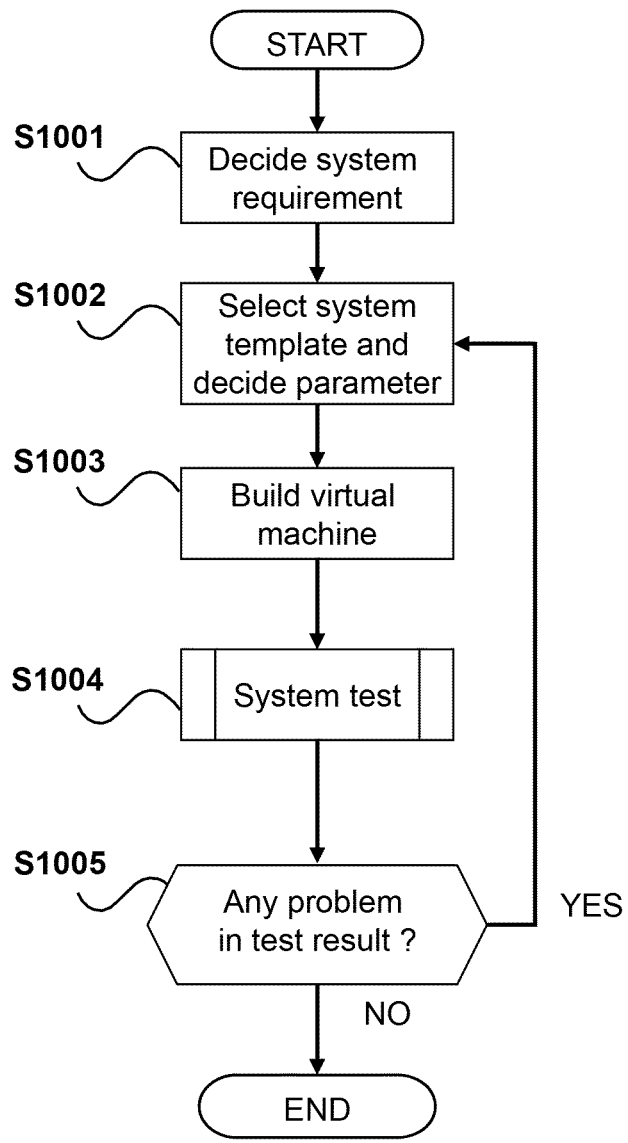
FIG. 10 is a flowchart showing an operation of the system orchestrator 100.

FIG. 10 is a flowchart describing an operation of the system orchestrator 100. Hereinafter, each step in FIG. 10 will be described.

(FIG. 10: Step S1001)

The system builder 500 decides requirements of the computer system that will be built by the system orchestrator 100 in subsequent steps. For example, the system builder 500 decides functional requirements defining functions to be implemented by the computer system or non-functional requirements such as performance or availability.

(FIG. 10: Step S1002)

The system builder 500 selects the system template 1611 according to the system requirements decided in step S1001. In addition, the system builder 500 decides configuration parameters such as those exemplified as configuration parameters 1 to 3 above. The system builder 500 notifies, to the system configuration program 1621, the selected system template 1611 and the configuration parameters. The system configuration program 1621 virtually creates, using the specified system template and the configuration parameters, network topologies of virtual machines included in the computer system. For example, the network topology shown in FIG. 3 (b) is created.

(FIG. 10: Step S1003)

The system builder 500 decides detailed specifications of each VM in the network topology created by the system configuration program 1621. The virtual machine build program 1622, according to the network topology created by the system configuration program 1621 and to the specified specifications of each VM: draws computational resources from the resource pool 300 through the resource pool manager 200 to build virtual machines; installs necessary software; and configures network connections. The virtual machine build program 1622 stores the information such as about the connection relationship of the built virtual machines and about installed software into the system data 1616, into the VM data 1613, into the inter-VM connection data 1614, into the system requirement data 1615, and into the VM software data 1617.

(FIG. 10: Step S1003: Additional Note)

In this step, it is not always necessary to additionally install software on a VM after building the VM. Alternatively, a VM image on which a combination of frequently used OS and software is installed/configured may be prepared in advance and the VM may be built using the VM image. In addition, necessary software may be added into the VM as long as required or unnecessary software may be removed from the VM.

(FIG. 10: Steps S1004-S1005)

The system test execution program 1624 performs a system test according to the flowchart that will be described with FIG. 11 later (S1004). The system test execution program 1624 presents the test result to the system builder 500. If the system builder 500 determines that "there is no problem", this flowchart terminates. If the system builder 500 determines that "there is a problem", the process returns to step S1002 and repeats similar processes using other configuration parameters, for example (S1005).

Figure 11:
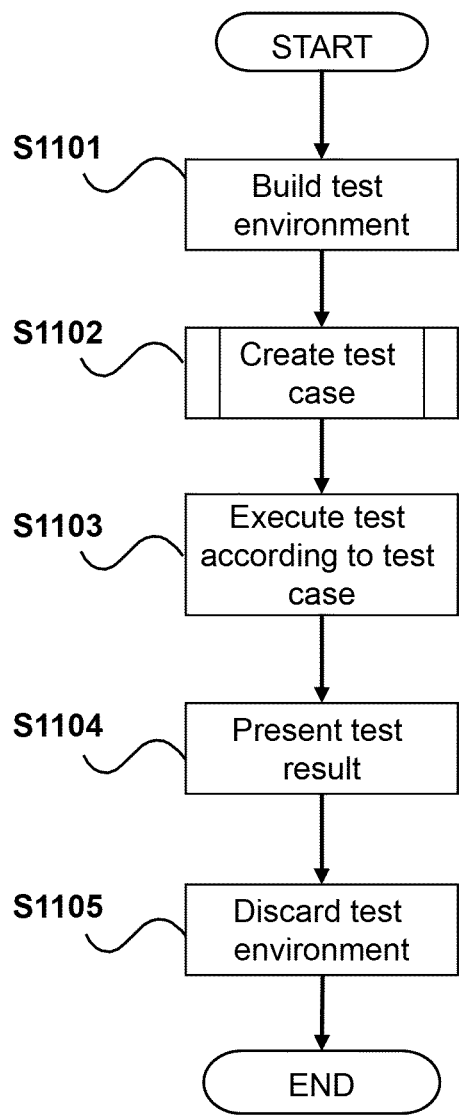
FIG. 11 is a flowchart showing a detail of step S1004.

FIG. 11 is a flowchart describing details of Step S1004. Hereinafter, each step in FIG. 11 will be described.

(FIG. 11: Step S1101)

The test environment build program 1626 builds a test environment for performing system tests. Specifically, following processes will be performed:

(build process No. 1) The test environment build program 1626 requires the resource pool manager 200 to create, in an area communicable with the computer system to be tested, a VM for creating test traffics and a VM for collecting test results;

(build process No. 2) The test environment build program 1626 executes, on the VMs created by the resource pool manager 200, a program for creating test traffics and a program for collecting test results;

(build process No. 3) The test environment build program 1626 executes, on the computer system to be tested, a test application that is previously built for each of system types of the computer system to be tested;

(build process No. 4) The test environment build program 1626 configures the test data that is prepared for the test application in advance so that the test data is available on the computer system to be performed.

(FIG. 11: Step S1101: Additional Note No. 1)

The objective of the system orchestrator 100 is to perform platform level tests. Thus application level tests are not always necessary to be performed. However, software that implements roles provided by virtual machines on the computer system (such as middleware providing Web server function, AP server function, or database function) usually provides the function through applications. Thus it may be difficult in such cases to perform tests if no application is installed. Therefore in this step, the test application is executed in order to check whether virtual machines are normally providing their roles.

(FIG. 11: Step S1101: Additional Note No. 2)

The test application is configured so that it utilizes functions that are unique to software implementing roles provided by virtual machines (e.g. Web server function, AP server function, database function). Therefore, it is possible to check, through the test application, whether the virtual machines are normally providing their roles.

(FIG. 11: Step S1102)

The test case creation program 1623 creates test cases according to the flowchart that will be described with FIG. 12 later.

(FIG. 11: Step S1103)

The system test execution program 1624 executes a system test according to the test case created in step S1102. The test result totalizing program 1625 collects information such as process time of the system test or computational loads.

(FIG. 11: Steps S1104-S1105)

The test result totalizing program 1625 presents, to the system builder 500, information such as process time of the system test or computational loads acquired in executing the system test (S1104). The test environment build program 1626 discards the test environment that is built for the system test this time (S1105).

Figure 12:
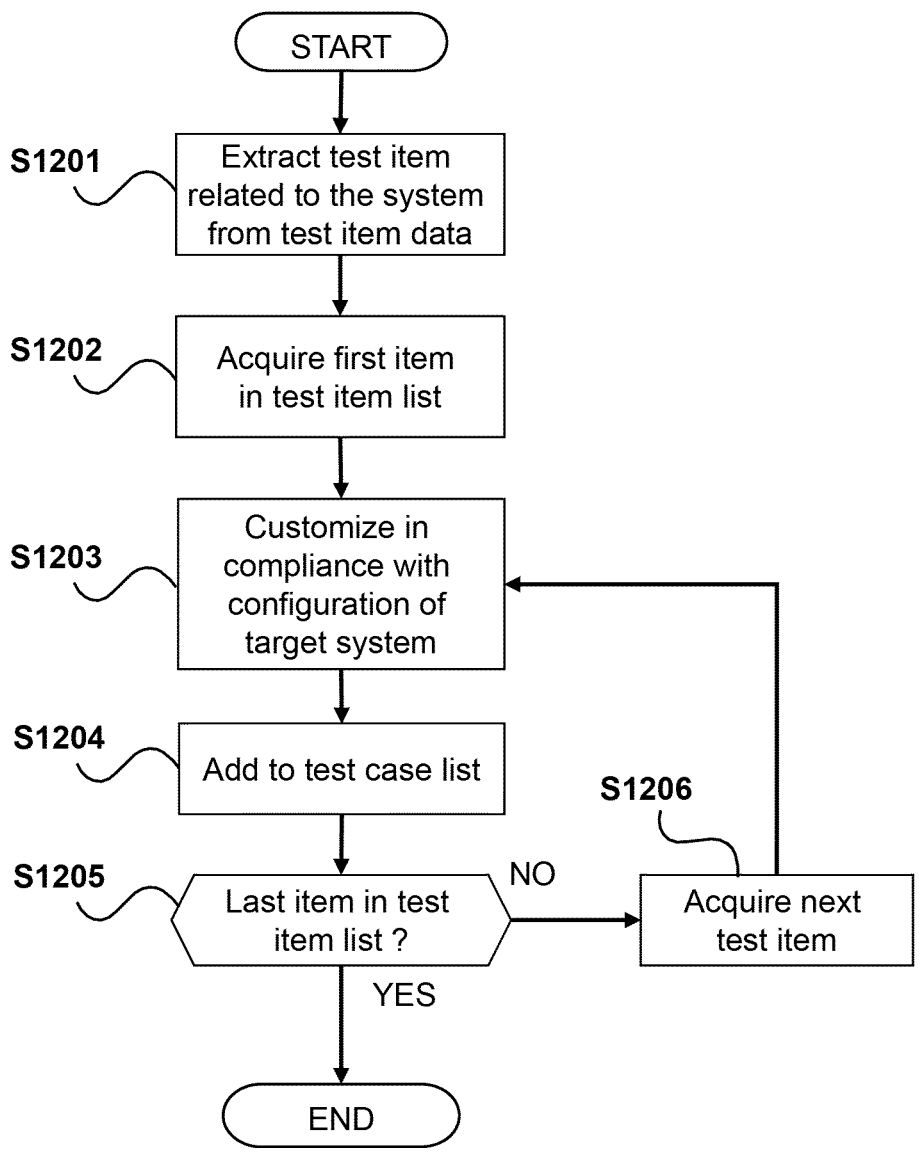
FIG. 12 is a flowchart showing a detail of step S1102.

FIG. 12 is a flowchart describing details of step S1102. Hereinafter, each step in FIG. 12 will be described.

(FIG. 12: Step S1201)

The test case creation program 1623 acquires, from the system data 1612 for example, the system type of the computer system to be tested. The test case creation program 1623 extracts, from the test item data 1616, test items corresponding to the acquired system type. Further, the test case creation program 1623 extracts, from the test item data 1616, test items to be performed for all system types.

(FIG. 12: Steps S1202-S1204)

The test case creation program 1623 picks up the first item in the test items extracted in step S1201 (S1202). The test case creation program 1623 extracts test items according to the system requirement (S1203) and adds the extracted test items to the test case list (S1204). Details of step S1203 will be described later.

(FIG. 12: Steps S1205-S1206)

The test case creation program 1623 checks whether it has reached the last item in the test items extracted in step S1201 (S1205). If reached, this flowchart terminates. If not, the test case creation program 1623 picks up the next test item (S1206) and returns to S1203 to perform similar processes.

(FIG. 12: Step S1203: Specific Example)

The test case creation program 1623 refers to the system requirement data 1615 to acquire a pair of the role 16154/the system function 16155 that corresponds to the system type of the computer system to be tested. According to the data example of FIG. 7, "Web/LB" and "DB/HA" are acquired if the computer system of system ID "1" is tested. The test case creation program 1623 extracts the role 16163/the test item 16164 in the test item data 1616 that correspond to the acquired pair of role/requirement type. According to the data example of FIG. 9, the test item IDs "1" and "3" correspond to it. Test items to be performed for all system types (test item IDs "6" and "7") are also extracted at this time. As a result, it is understood that: a load balancing test (LB) is performed with respect to VMIDs "2" to "4"; a multiplexing test (HA) is performed with respect to VMIDs "5" and "6"; and a connectivity test (Connect) and a response performance test (Perf) will be performed for all VMs.

(FIG. 12: Step S1203: Additional Note)

In this step, the test case creation program 1623 may customize specific parameters of test cases. For example, values such as IDs or IP addresses of each virtual machine are different in individual computer systems. Such specific parameters may be defined in the test items as customizable parameters. The test cases may be customized by applying actual values into the customizable parameters. Actual values may be acquired from each data in the storage device 160.

<Embodiment 1: Summary>

As discussed thus far, in the virtual machine test system according to the present invention, the system orchestrator 100 automatically creates computer systems according to network topologies and roles of virtual machines defined in the system template 1611. The system orchestrator 100 automatically performs platform level tests with respect to the built computer system according to test items that are defined for each combination of network topology and role of virtual machine. Consequently, test burdens for checking whether system configurations satisfying the system requirements intended by the system builder 500 are built may be decreased. Efficiency or quality of system tests can be improved, because the platform level test can be automatically performed when the computer system is built using physical environments owned by users.

<Embodiment 2>

In an embodiment 2 of the present invention, display examples presented by the system orchestrator 100 to the system builder 500 will be described. In addition, specific examples of test items will also be described.

<Embodiment 2: Display Example>

Figure 13:
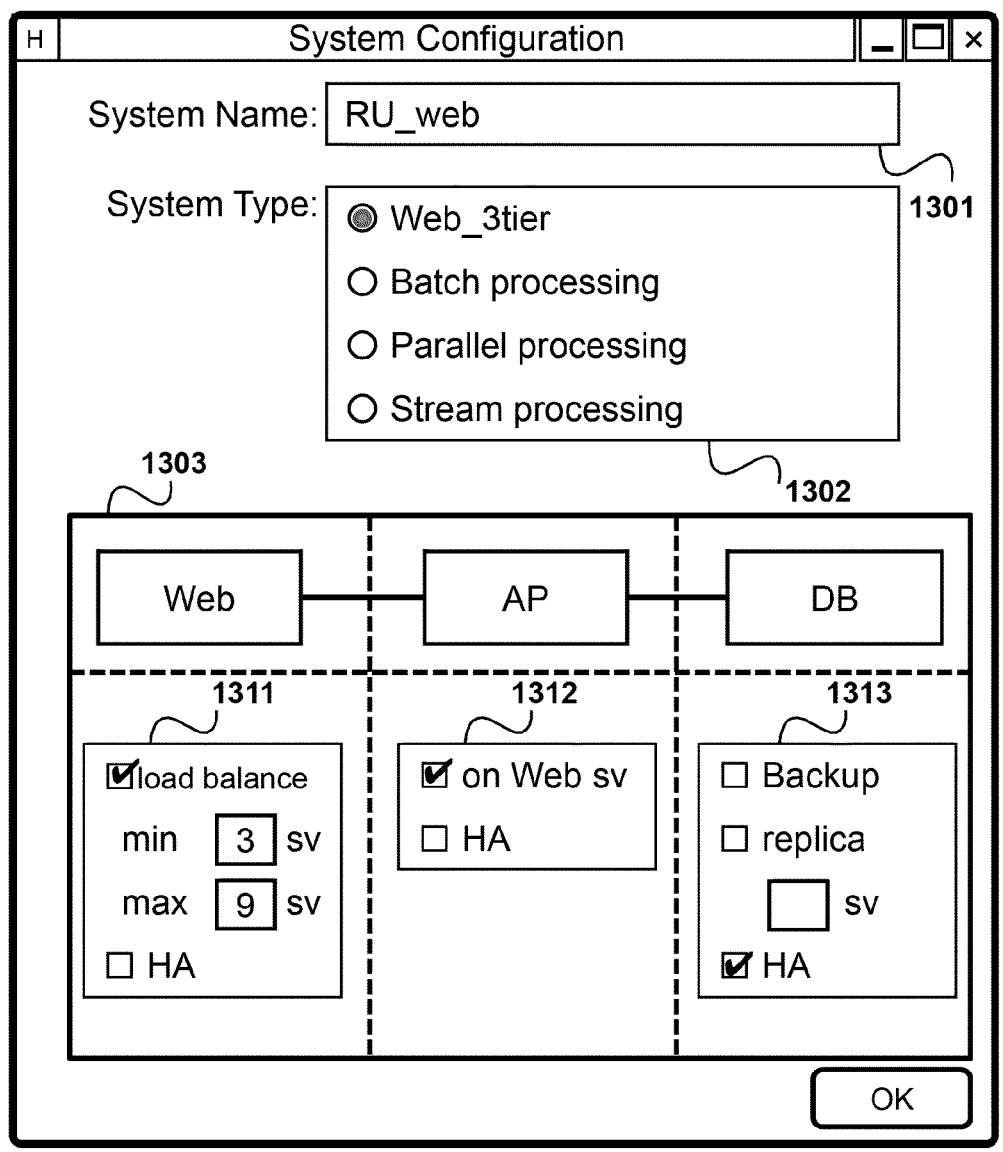
FIG. 13 is a diagram showing a display example presented by the system orchestrator 100 in step S1002.

FIG. 13 is a diagram showing a display example presented by the system orchestrator 100 in step S1002. The system orchestrator 500 inputs the system template 1611 and configuration parameters using this screen. The system orchestrator 100 notifies the inputted information to the system configuration program 1621.

The system name field 1301 is a field where names of computer systems to be built (in this example, "RU_web") are inputted. The template select field 1302 is a field where the system template 1611 is selected (in this example, "Web_3tier" indicating Web 3-tier system). When the system builder 500 selects the system template 1611, the configuration parameter field 1303 displays fields for inputting configuration parameters corresponding to the selected template. In the example shown in FIG. 13, a configuration parameter 1311 for Web server, a configuration parameter 1312 for AP server, and a configuration parameter 1313 for DB server are displayed as configuration parameters for Web 3-tier system.

Regarding Web server, it is possible to select whether load balancing function (LB) or multiplexing function (HA) is used. If load balancing function is used, minimum and maximum numbers of servers may be specified. Regarding AP server, it is possible to select: whether the AP server is built integrally with Web server; and whether multiplexing function is used. Regarding DB server, it is possible to select whether backup function, replication function, or multiplexing function is used. If replication function is used, it is possible to specify the number of servers.

When the system builder 500 inputs each configuration parameter and presses the OK button on the display of FIG. 13, the system configuration program 1621 and the virtual machine build program 1622 build virtual machines according to the system template 1611 and each configuration parameter, and reflect the build result in each data stored in the storage device 160.

Figure 14:
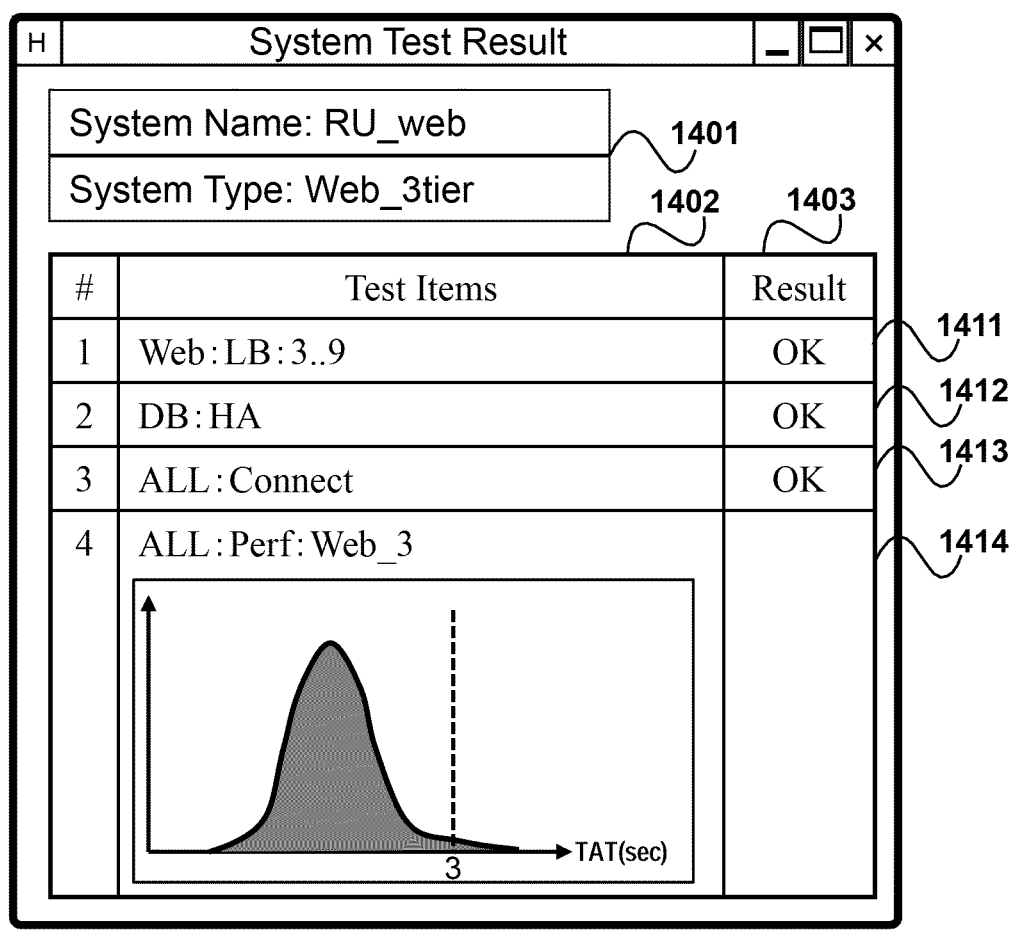
FIG. 14 is a diagram showing a display example presented by the system orchestrator 100 in step S1004.

FIG. 14 is a diagram showing a display example presented by the system orchestrator 100 in step S1004. The system information field 1401 displays the name of the computer system to be tested and the type of system template, respectively. The test item field 1402 displays performed test items. The result field 1403 displays test results.

The test result 1411 shows that load balancing (LB) tests for Web servers are performed using from three servers to nine servers and no problem has been found. The test result 1412 shows that a multiplexing (HA) test for DB server is performed and no problem has been found. The test result 1413 shows that connectivity (Connect) tests for all servers are performed and no problem has been found. The test result 1414 shows test results of response performance (Perf) tests for three Web servers are shown in the form of distribution diagram of response time (TAT). According to the test result 1414, there are very few responses exceeding three seconds. If this satisfies the target response performance, the system configuration has no problem. If this does not satisfy the target response performance, the system builder 500 may change configurations such as by increasing the minimum number of Web servers.

<Embodiment 2: Test Item Example>

In load balancing test (LB), test items may be defined for checking such as: (a) whether requests are evenly dispatched to each VM; or (b) whether the sum of request number processed by each VM matches with the total request number. If minimum and maximum numbers of servers are specified, test items may be defined for checking (c) whether response performance is improved by increasing the number of VMs from the minimum number to the maximum number. In addition, in terms of not creating SPOF (Single Point Of Failure), test items may be defined for checking (d) whether load-balanced VMs are built on at least two physical servers separately. It is possible for the system test execution program 1624 to check on which physical server a virtual machine is built by referring the VM data 1613.

In multiplexing test (HA), test items may be defined for checking such as: (a) whether the secondary system appropriately takes over the primary system even when stopping the primary system during processing requests; or (b) whether the master-sub relationship is appropriately rebuilt when the process returns back from the secondary system to the primary system. In addition, as for load balancing test, test items may be defined for checking (c) whether multiplexed VMs are built on at least two physical machines separately.

In the display of FIG. 13, if load balancing function (LB) or multiplexing function (HA) is specified, the minimum number of physical servers on which virtual machines are built may also be specified. In this case, when performing load balancing test or multiplexing test, test items may be defined for checking whether load-balanced or multiplexed VMs are built on at least specified numbers of physical machines.

In replication test (Replica), test items may be defined for checking whether data on the source DB server is appropriately copied to the destination DB server, for example. In backup test (Backup), test items may be defined for checking whether backed up data can be restored appropriately, for example.

REFERENCE SIGNS LIST

100: system orchestrator
1611: system template
1612: system data
1613: VM data
1614: inter-VM connection data
1615: system requirement data
1616: test item data
1617: VM software data
1621: system configuration program
1622: virtual machine configuration program
1623: test case creation program
1624: system test execution program
1625: test result totalizing program
1626: test environment build program
200: resource pool manager
300: resource pool
1000: virtual machine test system

The invention claimed is:

1. A virtual machine test system that performs a platform level test with respect to a computer system that is built using multiple virtual machines, comprising:
    a system template that defines a template regarding a combination of a type of a network topology of multiple virtual machines building the computer system and a role provided by each of the virtual machines in the computer system corresponding to the type;
    a virtual machine build unit that receives an instruction to build the computer system designating the type, and that builds, according to the template corresponding to the designated type, the computer system equipping software providing the role in the computer system;
    a test item list that defines a platform level test item with respect to the computer system for each combination of the type and the role;
    a test case creation unit that reads out a test item corresponding to the designated type from the test item list to create a test case; and
    a test perform unit that performs a platform level test with respect to the computer system according to a test case created by the test case creation unit and that stores a result of the platform level test into a storage device.

2. The virtual machine test system according to claim 1, wherein the test item list defines, for each of the roles of the virtual machines, a test item with respect to a platform level system function provided by the virtual machine or by the computer system,
    wherein the virtual machine build unit receives, along with a designation to the type, a designation to a platform level system function that is to be implemented by each of the virtual machines or by the computer system, and builds the computer system implementing the designated system function,
    and wherein the test case creation unit reads out a test item corresponding to the designated system function from the test item list, and creates a test case with respect to the system function.

3. The virtual machine test system according to claim 2, wherein the test item list defines, as a test item with respect to the system function, a test item with respect to a load balancing function that performs load balancing using the multiple virtual machines, a test item with respect to a multiplexing function that multiplexes the virtual machine using the multiple virtual machines, a test item with respect to a replication function that copies a database equipped in the virtual machine, and a test item with respect to a backup function that creates a backup for a database equipped in the virtual machine,
    wherein the virtual machine build unit receives, as a platform level system function that is to be implemented by each of the virtual machines or by the computer system, an instruction designating at least one of the load balancing function, the multiplexing function, the replication function, and the backup function,
    and wherein the test case creation unit reads out a test item corresponding to the designated load balancing function, the multiplexing function, the replication function, or the backup function from the test item list, and creates a test case with respect to the read out system function.

4. The virtual machine test system according to claim 1, wherein the test item list defines a common test item to be performed regardless of the type,
    and wherein the test case creation unit creates a common test case to be performed with respect to all of the virtual machines according to description of the common test item.

5. The virtual machine test system according to claim 4, wherein the virtual machine build unit stores, into the storage device, virtual machine connection data describing a connection relationship between the built virtual machines, wherein the test item list defines, as the common test item, a test item with respect to connectivity between the virtual machines, and wherein the test case creation unit creates a test case for testing connectivity between the virtual machines according to description of the virtual machine connection data and to the common test item.

6. The virtual machine test system according to claim 4, wherein the test item list defines, as the common test item, a test item with respect to response performance of the virtual machine, and wherein the test case creation unit creates a test case for testing response performance of the virtual machine according to the common test item.

7. The virtual machine test system according to claim 1, wherein the virtual machine build unit builds, on the virtual machine, a test application that is implemented for testing a unique function included in software providing the role and that utilizes the unique function, and wherein the test case creation unit creates a test case for testing, by performing a test with respect to the test application, whether the software providing the role is normally working.

8. The virtual machine test system according to claim 3, wherein the virtual machine creation unit stores, into the storage device, virtual machine data that describes information identifying a physical machine on which the virtual machine is built, wherein the test case creation unit, if the virtual machine includes the load balancing function or the multiplexing function as the system function, creates a test case for checking whether multiple of the virtual machines providing the load balancing function or the multiplexing function are built on at least two physical machines, and wherein the test perform unit, according to description of the virtual machine data, tests whether multiple of the virtual machines providing the load balancing function or the multiplexing function are built on at least two physical machines.

9. The virtual machine test system according to claim 8, wherein the virtual machine build unit receives an instruction that specifies a minimum number of physical machines on which the multiple virtual machines providing the load balancing function or the multiplexing function are built, and builds the virtual machine according to the instruction, and wherein the test perform unit tests, according to description of the virtual machine data, whether the multiple virtual machines providing the load balancing function or the multiplexing function are built on at least the minimum number of physical machines.

10. A virtual machine test method for performing a platform level test with respect to a computer system that is built using multiple virtual machines, comprising steps of:

reading out a system template that defines a template regarding a combination of a type of a network topology of multiple virtual machines building the computer system and a role provided by each of the virtual machines in the computer system corresponding to the type;

a virtual machine build step for receiving an instruction to build the computer system designating the type, and building, according to the template corresponding to the designated type, the computer system equipping software providing the role in the computer system;

reading out a test item list that defines a platform level test item with respect to the computer system for each combination of the type and the role;

a test case creation step for reading out a test item corresponding to the designated type from the test item list to create a test case; and a test perform step for performing a platform level test with respect to the computer system according to a test case created in the test case creation step and for storing a result of the platform level test into a storage device.

* * * * *